(12) United States Patent
Saito et al.

(10) Patent No.: US 9,014,927 B2
(45) Date of Patent: Apr. 21, 2015

(54) SHIFT CONTROL SYSTEM AND SHIFT CONTROL METHOD

(71) Applicants: Hidenori Saito, Toyota (JP); Masakazu Owatari, Nagakute (JP); Takashi Miura, Toyota (JP); Masayasu Mizobuchi, Nisshin (JP)

(72) Inventors: Hidenori Saito, Toyota (JP); Masakazu Owatari, Nagakute (JP); Takashi Miura, Toyota (JP); Masayasu Mizobuchi, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/649,542

(22) Filed: Oct. 11, 2012

(65) Prior Publication Data
US 2013/0110360 A1    May 2, 2013

(30) Foreign Application Priority Data

Oct. 28, 2011    (JP) .................. 2011-237372

(51) Int. Cl.
| F16H 61/68 | (2006.01) |
| F16H 61/02 | (2006.01) |
| F16H 61/686 | (2006.01) |
| F16H 59/18 | (2006.01) |
| F16H 61/04 | (2006.01) |

(52) U.S. Cl.
CPC .......... *F16H 61/0213* (2013.01); *F16H 61/686* (2013.01); *F16H 2059/186* (2013.01); *F16H 2200/006* (2013.01); *F16H 2200/2007* (2013.01); *F16H 2200/2023* (2013.01); *F16H 2200/2048* (2013.01); *F16H 2061/0444* (2013.01)

(58) Field of Classification Search
USPC ........................................... 701/51
See application file for complete search history.

(56) References Cited

U.S. PATENT DOCUMENTS

| 5,415,604 | A | 5/1995 | Bates et al. | |
| 5,761,628 | A * | 6/1998 | Steeby et al. | 701/64 |
| 5,875,410 | A * | 2/1999 | Fowler et al. | 701/64 |
| 7,212,898 | B2 * | 5/2007 | Whitton et | 701/51 |
| 7,568,991 | B2 * | 8/2009 | Inuta | 475/120 |
| 8,255,132 | B2 * | 8/2012 | Tabata et al. | 701/59 |
| 2012/0173098 | A1 * | 7/2012 | Swartling et al. | 701/51 |

FOREIGN PATENT DOCUMENTS

| JP | 5-235794 | | 9/1993 | |
| JP | 10-103497 | | 4/1998 | |
| JP | 2008-180251 | | 8/2008 | |
| JP | 2010-266045 | | 11/2010 | |
| SE | WO2011031229 | * | 3/2011 | ............. F16H 59/44 |
| SE | WO2011031230 | * | 3/2011 | ..................... 701/51 |
| SE | WO2011031231 | * | 3/2011 | ..................... 701/51 |

* cited by examiner

*Primary Examiner* — Calvin Cheung
*Assistant Examiner* — Allen E Quillen
(74) *Attorney, Agent, or Firm* — Oblon, McClelland, Maier & Neustadt, L.L.P.

(57) ABSTRACT

A shift control system is mounted on a vehicle that includes a transmission. The transmission includes a multi-gear shifting mechanism. Also, the transmission is configured to shift a speed of rotational power from an engine in response to a shift request and to output the rotational power to a drive wheel side. The shift control system includes a detecting unit and a control unit. The detecting unit detects the shift request. When the detecting unit has detected a multiple-gear skip downshift request as the shift request from a first gear to a second gear, the control unit executes shift control that includes a skip shift from the first gear to a predetermined intermediate-speed gear and a sequential shift from the predetermined intermediate-speed gear to the second gear, the first gear been higher by multiple gears than the predetermined intermediate-speed gear.

8 Claims, 5 Drawing Sheets

| | | C1 | C2 | C3 | C4 | B1 | B2 | F1 |
|---|---|---|---|---|---|---|---|---|
| P | | × | × | × | × | × | × | × |
| R | | × | × | × | ○ | × | ○ | × |
| N | | × | × | × | × | × | × | × |
| D | 1st | ○ | × | × | × | × | ◎ | △ |
| | 2nd | ○ | × | × | × | ○ | × | × |
| | 3rd | ○ | × | ○ | × | × | × | × |
| | 4th | ○ | × | × | ○ | × | × | × |
| | 5th | ○ | ○ | × | × | × | × | × |
| | 6th | × | ○ | × | ○ | × | × | × |
| | 7th | × | ○ | ○ | × | × | × | × |
| | 8th | × | ○ | × | × | ○ | × | × |

SHIFT CONTROL SYSTEM AND SHIFT CONTROL METHOD

INCORPORATION BY REFERENCE

The disclosure of Japanese Patent Application No. 2011-237372 filed on Oct. 28, 2011 including the specification, drawings and abstract is incorporated herein by reference in its entirety.

BACKGROUND OF THE INVENTION

1. Field of the Invention

The invention relates to a shift control system and shift control method that control a shifting mechanism provided in a drive-train of a vehicle. More particularly, the invention relates to a shift control system and shift control method that cause the shifting mechanism to shift multiple gears in response to an input operation and to selectively make a skip shift.

2. Description of Related Art

In an automatic transmission mounted on a vehicle, there is known a shift control system or a shift control method that selectively executes automatic shift control and manual shift control. In the automatic shift control, rotational power from a driving source is automatically shifted in speed among multiple gears on the basis of an accelerator operation amount and a vehicle speed. In the manual shift control, rotational power from the driving force is shifted in speed among multiple gears on the basis of a manual operation input by a driver. In addition, by employing a by-wire technology, a shift control system or a shift control method that is able to make a sequential upshift or downshift in one gear (sequential shift) not only by operating an existing shift lever but also by operating a paddle or a switch provided on a steering wheel has been widely used.

There is a shift control system of this type, for example, which is able to make a skip shift. In the skip shift, when a sequential shift operating lever is quickly operated multiple times successively, a transmission path of a gear finally selected by the multiple operations is directly formed without forming a transmission path of a gear selected on the way (for example, see Japanese Patent Application Publication No. 05-235794 (JP 05-235794 A) and U.S. Pat. No. 5,415,604).

Furthermore, there is known a shift control system that, when it is predicted to enter a driven state where an internal combustion engine is driven by a drive wheel side to accelerate if a skip shift is made to a gear finally selected through successive multiple downshift operations input to a downshift switch, prohibits a downshift to the finally selected gear and a gear having a higher gear ratio than the finally selected gear (for example, see Japanese Patent Application Publication No. 2010-266045 (JP 2010-266045 A)).

However, in these shift control systems and shift control methods, there are many number of times of sequential shifts in an automatic shift mode, so a response to a driver's acceleration request, or the like, is not sufficient. In addition, when a skip shift to a gear that causes a driven state is requested through an input shift operation, it is not possible to respond as requested. Furthermore, even when a skip shift to a gear that does not cause a driven state is requested through an input shift operation, an acceleration or deceleration of a vehicle through the skip shift may differ from a degree of acceleration or deceleration intended by a driver, so there is a possibility that it is not possible to sufficiently improve drivability.

That is, when the number of gears of an automatic transmission increases, the number of intervening gears increases when a sequential shift to a required gear is made in the automatic shift mode. Therefore, a plurality of hydraulic frictional engagement elements in the automatic transmission repeatedly turn on or off (engage or disengage) such that intervening gears are sequentially formed. Thus, a response to a driver's acceleration request, or the like, may not be sufficiently obtained.

In addition, when the number of gears increases, a deceleration expected by the driver is hard to match with a driver's request operation depending on a set gear step (difference (change width) in gear ratio between adjacent gears) between multiple gears. Then, when a deviation between a deceleration expected by the driver and a driver's request operation increases through successive multiple shift operations, an acceleration or deceleration of the vehicle through a skip shift may tend to differ from a degree of acceleration or deceleration intended by the driver.

In addition, such a situation that an acceleration or deceleration of the vehicle before and after a skip shift differs from a degree intended by the driver may occur even when a skip shift is made through a shift command based on an acceleration request operation in the automatic shift mode.

SUMMARY OF THE INVENTION

The invention provides a shift control system and a shift control method that improve drivability by allowing a skip downshift in a multi-gear shifting mechanism while suppressing a variation in acceleration or deceleration before and after the skip shift.

A first aspect of the invention relates to a shift control system that is mounted on a vehicle that includes a transmission, the transmission including a multi-gear shifting mechanism, and the transmission being configured to shift a speed of rotational power from an engine in response to a shift request, and to output the rotational power to a drive wheel side. The shift control system includes a detecting unit and a control unit. The detecting unit detects the shift request. When the detecting unit has detected a multiple-gear skip downshift request as the shift request from a first gear to a second gear, the control unit executes shift control that includes a skip shift from the first gear to a predetermined intermediate-speed gear and a sequential shift from the predetermined intermediate-speed gear to the second gear, the first gear been higher by multiple gears than the predetermined intermediate-speed gear.

In this system, shift control includes a skip shift between the first gear and the predetermined intermediate-speed gear and a sequential shift between the second gear and the predetermined intermediate-speed gear, and the shift control is executed. Thus, while ensuring a response by allowing a skip shift in the multi-gear transmission having a large number of gears, it is possible to improve drivability by appropriately suppressing a variation in the acceleration or deceleration of the vehicle before and after the skip shift within a predetermined limited range using a sequential shift as well.

A second aspect of the invention relates to a shift control method that is mounted on a vehicle that includes a transmission, the transmission including a multi-gear shifting mechanism, and the transmission being configured to shift a speed of rotational power from an engine in response to a shift request, and to output the rotational power to a drive wheel side. The shift control method includes: detecting the shift request; and, when a multiple-gear skip downshift request from a first gear to a second gear has been detected as the shift request, executing shift control that includes a skip shift from the first gear to the predetermined intermediate-speed gear and a sequential shift from the predetermined intermediate-speed gear to the second gear, the first gear being higher by multiple gears than the predetermined intermediate-speed gear.

In this method, shift control includes a skip shift between the first gear and the predetermined intermediate-speed gear and a sequential shift between the second gear and the predetermined intermediate-speed gear, and the shift control is executed. Thus, while ensuring a response by allowing a skip shift in the multi-gear transmission having a large number of gears, it is possible to improve drivability by appropriately suppressing a variation in the acceleration or deceleration of the vehicle before and after the skip shift within a predetermined limited range using a sequential shift as well.

According to the aspects of the invention, when a multiple-gear skip downshift from the first gear to the second gear in the multi-gear shifting mechanism is requested, shift control is executed, the shift control including a skip shift from the first gear to the predetermined intermediate-speed gear and a sequential shift from the predetermined intermediate-speed gear to the second gear. That is, the shift control system and the shift control method of the aspects of the invention use a sequential shift as well while ensuring a response by allowing the skip shift in the multi-gear transmission having a large number of gears. Therefore, a variation is appropriately suppressed in acceleration or deceleration before and after a skip shift within a predetermined limited range. Thus, the drivability improves.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

FIG. 1 to FIG. 5 show a shift control system according to a first embodiment of the invention.

Figure 1:
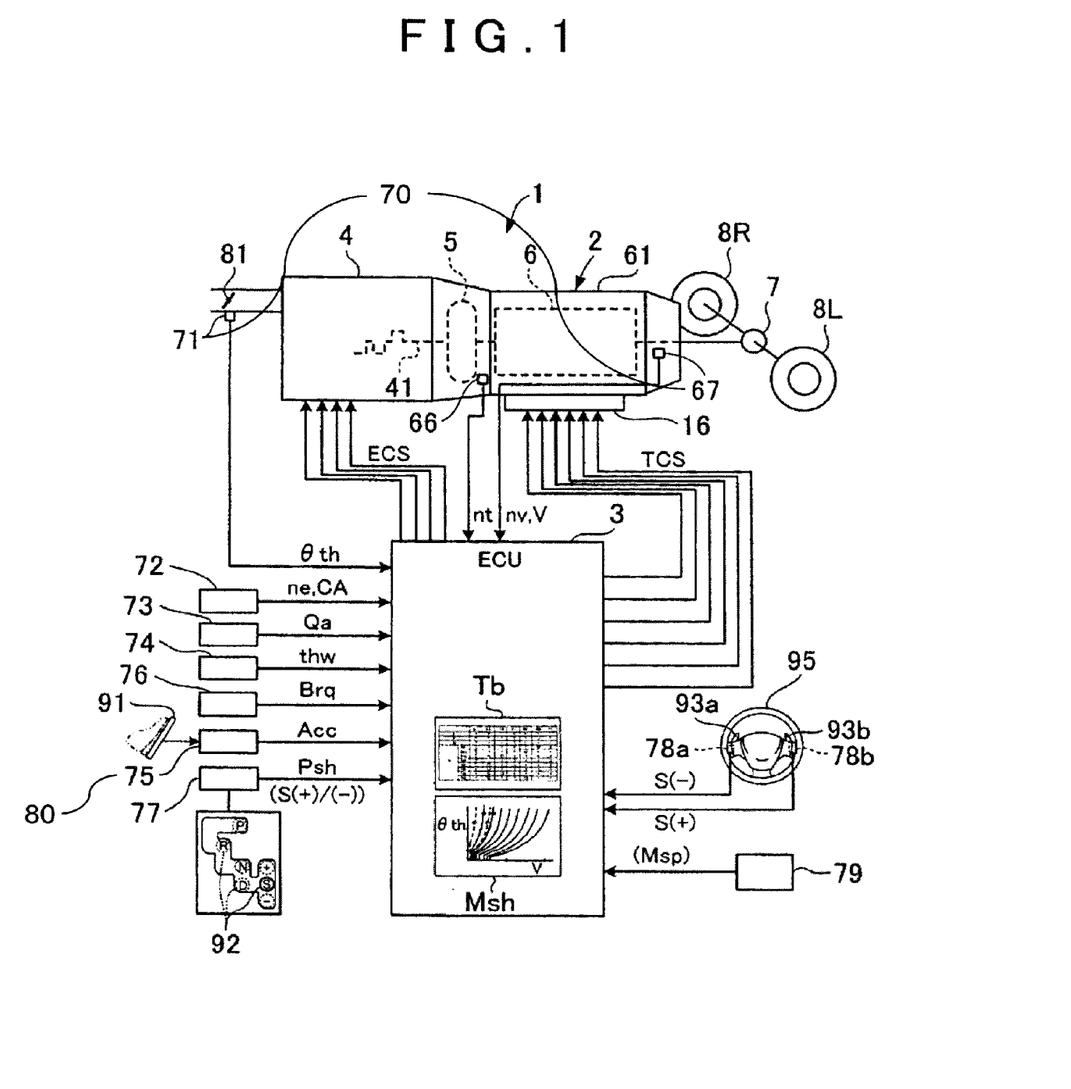
FIG. 1 is a schematic configuration diagram of a shift control system according to a first embodiment of the invention.

As shown in FIG. 1, the shift control system according to the present embodiment is configured as an electronic control unit 3 that controls a driving system 2 of a vehicle 1.

The vehicle 1 is a rear-wheel-drive vehicle that includes right and left front wheels (not shown) and right and left rear wheels 8R and 8L (drive wheels). The vehicle 1 is able to travel as the rear wheels 8R and 8L are driven by the driving system 2 for rotation.

The driving system 2 is formed of an engine 4 and a transmission 6. The engine 4 serves as a driving source. The transmission 6 receives rotational power output from the engine 4 via a torque converter 5, and shifts the rotational power in speed and outputs the rotational power to a differential unit 7 adjacent to the rear wheels 8R and 8L.

The engine 4 is a known multi-cylinder four-cycle internal combustion engine, and is, for example, a spark-ignition internal combustion engine. The engine 4 is able to output rotational power from a crankshaft 41 that is an output shaft.

Figure 2:
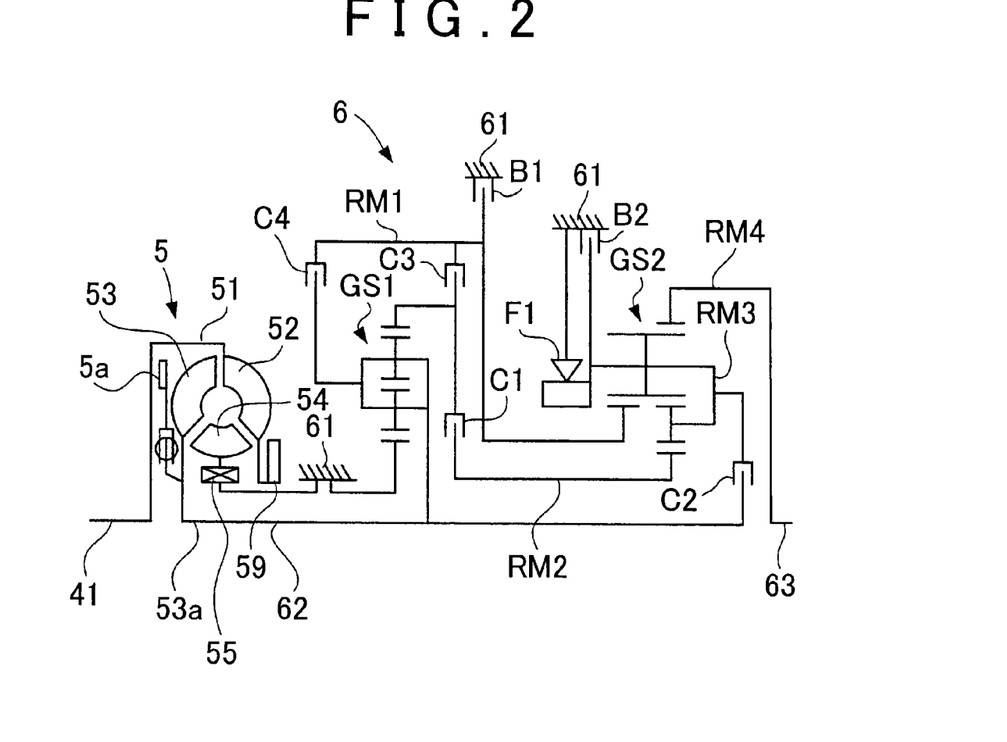
FIG. 2 is a skeleton diagram that shows a multi-gear shifting mechanism of a transmission of a vehicle that includes the shift control system according to the first embodiment of the invention.

As shown in FIG. 2, the torque converter 5 is equipped with a known lockup mechanism. The torque converter 5 executes lockup control for locking a lockup clutch 5a at least in a high-speed rotation range, and further executes so-called flex lockup control in low-speed and middle-speed ranges. By so doing, it is possible to suppress a slip loss.

Specifically, the torque converter 5 includes a shell cover 51, a pump impeller 52, a turbine runner 53, a stator 54 and a one-way clutch 55, and hydraulic fluid (not shown) is contained in the shell cover 51.

Here, the shell cover 51 is coupled to the crankshaft 41 of the engine 4 via a drive plate (not shown), and the pump impeller 52 is mounted on the inner face side of the shell cover 51. The turbine runner 53 faces the pump impeller 52, and has a turbine shaft 53a that is integrally coupled to the transmission 6 side (input shaft 62 (described later)). The stator 54 is supported by a case 61 of the transmission 6 via the one-way clutch 55 so as to be rotatable in one direction, and is located between the pump impeller 52 and the turbine runner 53. Then, when flow of hydraulic fluid in the shell cover 51 is generated by the rotation of the input-side pump impeller 52 driven by the crankshaft 41 of the engine 4, the turbine shaft 53a receives the inertia force of the flow of hydraulic fluid and rotates the input shaft 62 of the transmission 6. In addition, the stator 54 rectifies the flow of hydraulic fluid returning from the turbine runner 53 to the pump impeller 52. This causes torque amplifying action due to the reaction force of the stator 54.

As shown in FIG. 2, the transmission 6 is a multi-gear shifting mechanism that is configured to include the input shaft 62, an output shaft 63, a plurality of planetary gear sets GS1 and GS2, a plurality of rotating elements RM1, RM2, RM3 and RM4, clutches C1, C2, C3 and C4, brakes B1 and B2, and a one-way clutch F1. The input shaft 62 and the output shaft 63 are arranged along the same axis. The plurality of planetary gear sets GS1 and GS2 and the plurality of rotating elements RM1, RM2, RM3 and RM4 are interposed between those input shaft 62 and output shaft 63. The clutches C1, C2, C3 and C4 and the brakes B1 and B2 serve as a plurality of hydraulic frictional engagement elements.

Figure 3:
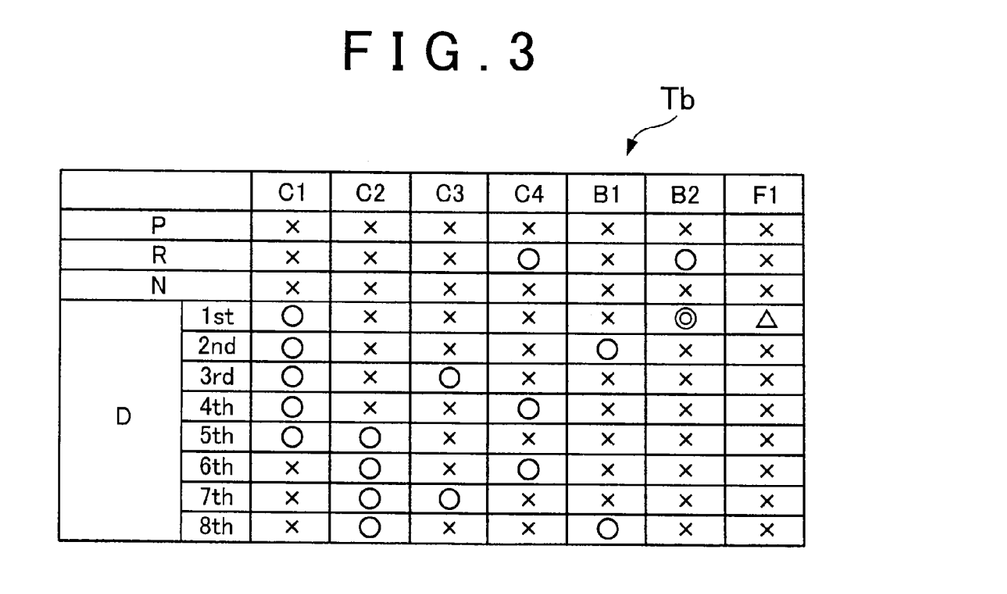
FIG. 3 is an engagement operation chart that shows engagement states of a plurality of frictional engagement elements mounted in the transmission shown in FIG. 2 in association with shift positions of the transmission.

As shown in FIG. 3, the transmission 6 shifts into any one of a plurality of drive ranges, such as a D (drive) range in which forward travelling is allowed, an R (reverse) range in which reverse travelling is allowed, an N (neutral) range in which a power transmission path is interrupted and a P (parking) range in which the output shaft 63 is locked, on the basis of a combination of engagement states of the plurality of clutches C1 to C4, brakes B1 and B2, and the like (including the one-way clutch F1; the same applies to the following description).

Furthermore, the transmission 6 selectively forms any one of gear trains among multiple gears interposed between the input shaft 62 and the output shaft 63. Here, the multiple gears are formed by various gear trains having different gear ratios (the number of revolutions nt per unit time of the input shaft 62/the number of revolutions nv per unit time of the output shaft 63, i.e., nt divided by nv) between the input shaft 62 and the output shaft 63. The gear ratios are respectively determined on the basis of the engagement states of the plurality of clutches C1 to C4, brakes B1 and B2, and the like.

Figure 4:
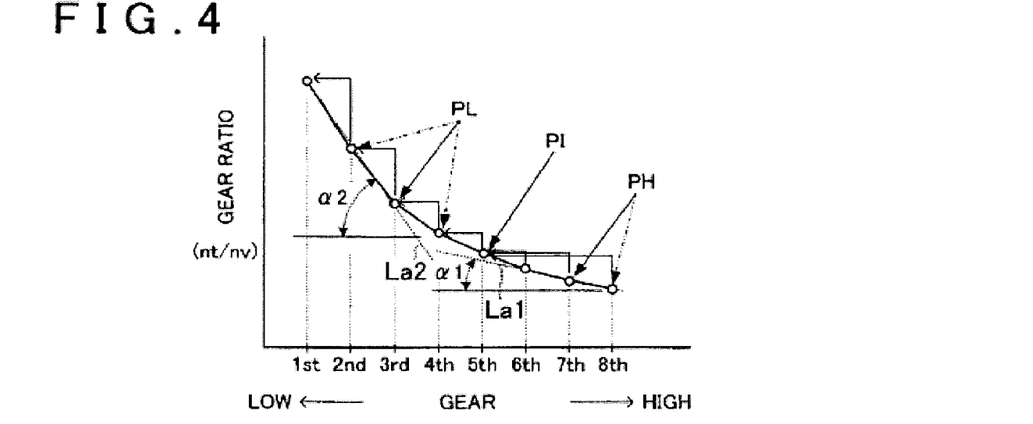
FIG. 4 is a graph that shows a setting example of gear steps from a first-speed gear to an eighth-speed gear in the transmission shown in FIG. 2, in which the ordinate axis represents a shift gear ratio, and the abscissa axis represents a gear.

More specifically, the transmission 6 shifts multiple gears from a first-speed gear ("1st" in FIG. 3 and FIG. 4, and a gear in which the speed is relatively low and the torque is relatively large) to an eighth-speed gear ("8th" in FIG. 3 and FIG. 4, and a gear in which the speed is relatively high and the torque is relatively small) in the D range as shown in FIG. 4 on the basis of the engagement states of the plurality of clutches C1 to C4, brakes B1 and B2, and the like. In the first-speed gear, the gear ratio between the input shaft 62 and the output shaft 63 is maximum. In eighth-speed gear, the gear ratio is minimum.

In addition, the transmission 6 includes a hydraulic controller 16.

Although not shown in details, the hydraulic controller 16, for example, includes a plurality of linear solenoid valves (not shown), a plurality of on/off solenoid valves, and a pressure regulating spool valve. The plurality of linear solenoid valves respectively controllably output hydraulic fluid pressures to the plurality of clutches C1 to C4 and brakes B1 and B2. The plurality of on/off solenoid valves and pressure regulating spool valve adjust a line pressure, a throttle pressure based on a vehicle speed, and an engagement hydraulic pressure of the lockup clutch 5a. Note that the line pressure is a supply hydraulic pressure supplied from a known oil pump 59 that is driven together with the pump impeller 52. In addition, the pressure regulating spool valve for line hydraulic pressure control in the transmission 6 is controlled by the throttle pressure such that a line hydraulic pressure of the transmission 6 based on torque generated by the engine 4 is obtained. That is, the throttle pressure is a signal hydraulic pressure. For example, the throttle pressure is generated by executing duty control over a solenoid valve for throttle hydraulic pressure control on the basis of a throttle valve opening degree of the engine 4.

The plurality of linear solenoid valves of the hydraulic controller 16 respectively change output hydraulic pressures on the basis of control signals from the electronic control unit 3. The plurality of linear solenoid valves each change the engagement state of a corresponding one of the plurality of clutches C1 to C4 and brakes B1 and B2 into any one of an engaged state indicated by "O" in FIG. 3 and a released state indicated by "x" in FIG. 3. Furthermore, the plurality of linear solenoid valves control transitional hydraulic pressure at the time of engaging or releasing through its energization current control. In addition, the plurality of on/off solenoid valves of the hydraulic controller 16 are configured to control a pressure regulating state of the pressure regulating spool valve through on/off control over the on/off solenoid valves.

In this way, in the present embodiment, the transmission 6 mounted on the vehicle 1 serves as a multi-gear shifting mechanism that is able to form a plurality of low-speed gears, a plurality of high-speed gears and a plurality of intermediate-speed gears present between the low-speed gears and the high-speed gears. The plurality of low-speed gears includes 1st, 2nd and 3rd from the first-speed gear to the third-speed gear. The plurality of high-speed gears includes 6th, 7th and 8th from the sixth-speed gear to the eighth-speed gear. The plurality of intermediate-speed gears includes 4th and 5th from the fourth-speed gear to the fifth-speed gear. Then, the transmission 6 shifts the speed of rotational power from the engine 4, and outputs the rotational power toward the rear wheels 8R and 8L that serve as the drive wheels.

The detailed hardware configuration of the electronic control unit 3 is not shown. The electronic control unit 3 includes a CPU, a RAM, a ROM, and a rewritable nonvolatile memory such as a PROM. Also, the electronic control unit 3 is configured to include an input interface circuit that has an A/D converter, an output interface circuit that has a driver and a relay switch, and a communication port that carries out data communication with another in-vehicle ECU.

For example, a system program, such as a real-time OS, a device driver and a middleware, is stored in the ROM of the electronic control unit 3. In addition, for example, an application program for executing various controls, a shift map Msh, table data Tb corresponding to the engagement operation chart shown in FIG. 3, and the like, are stored in the PROM of the electronic control unit 3.

Here, the shift map Msh is used to select the gear of the transmission 6 suitable for a travelling state of the vehicle 1 on the basis of a vehicle speed V [km/h] of the vehicle 1 and a throttle valve opening degree θth [%] of the engine 4. The vehicle speed V correspond to the number of revolutions nv per unit time of the output shaft 63. Although not shown in details, the shift map Msh is configured by partitioning all the operation range of the vehicle 1 into a plurality of proper gear ranges corresponding to the multiple gears of the transmission 6 by a plurality of shift lines (gear shift lines). Here, all the operation range of the vehicle is understood as all the variable range of the throttle valve opening degree θth of the engine 4 and the vehicle speed V of the vehicle 1. Also, the shift map Msh is a map by which an appropriate gear is selectable in real-time on the basis of a current throttle valve opening degree θth and a current vehicle speed V that are repeatedly detected at short intervals. Note that such a shift map itself is known, and the detailed description of the shift map is omitted; however, the plurality of shift lines and the proper gear ranges are different between upshift and downshift.

In addition to a throttle opening degree sensor 71, a crank angle sensor 72, an air flow meter 73, a coolant temperature sensor 74, and the like, equipped for the engine 4, an accelerator position sensor 75, a brake pedal depression force sensor 76, a shift lever position sensor 77, paddle operation detecting switches 78a and 78b, a specific travel mode selection switch 79, and the like are provided for the vehicle 1, and are connected to the input interface circuit of the electronic control unit 3. Furthermore, an input shaft rotation speed sensor 66 and an output shaft rotation speed sensor 67 that are provided in the transmission 6 are connected to the input interface circuit of the electronic control unit 3.

The throttle opening degree sensor 71 detects an opening degree θth of an electronic throttle valve 81 of the engine 4. The crank angle sensor 72 detects a rotation angle CA of the crankshaft 41 per unit time from which it is possible to calculate an engine rotation speed ne [rpm]. The air flow meter 73 detects an intake air flow rate Qa of the engine 4. The coolant temperature sensor 74 detects a coolant temperature thw of the engine 4. In addition, the accelerator position sensor 75 detects a depression operation amount Acc (accelerator operation amount corresponding to the depression operation amount) of an accelerator pedal 91 provided for the vehicle 1. The brake pedal depression force sensor 76 detects a depression force Brq applied to a brake pedal provided for the vehicle 1.

The shift lever position sensor 77 detects an operating position Psh (for example, P, R, N, D and S) of a shift lever 92 equipped in, for example, a vehicle cabin of the vehicle 1. The shift lever position sensor 77 may serve as a shift switch for detecting sequential shift operation. That is, the shift lever position sensor 77 detects an operation position (S(+)) corresponding to an upshift (+) direction of the shift lever 92 in a sequential shift mode selection position S and an operation position (S(−)) corresponding to a downshift (−) direction of the shift lever 92 in the sequential shift mode selection position S.

In addition, the paddle operation detecting switches 78b and 78a are shift switches for detecting sequential shift operation. The paddle operation detecting switches 78b and 78a respectively detect whether right and left paddles 93b and 93a for sequential shift operation are operated. The right and left paddles 93b and 93a are provided on a steering wheel 95. Then, the left paddle operation detecting switch 78a detects a downshift (−) request operation, and the right paddle operation detecting switch 78b detects an upshift (+) request operation.

The specific travel mode selection switch 79 is an operating unit that requests to shift from a standard travel mode to, for example, a specific mode. In the specific mode, the kinetic performance and drivability of the vehicle 1 are given a priority.

The input shaft rotation speed sensor 66 detects the number of revolutions nt [rpm] per unit time of the input shaft 62. The output shaft rotation speed sensor 67 detects the number of revolutions nv [rpm] per unit time of the output shaft 63.

In addition to the electronic throttle valve 81, a fuel pump, fuel injection valves, igniters (ignition coils), a starter motor, and the like (not shown), at the engine 4 side, are connected to the output interface circuit of the electronic control unit 3. Also, the linear solenoid valves, the on/off solenoid valves, and the like, of the hydraulic controller 16 at the transmission 6 side are connected to the output interface circuit of the electronic control unit 3.

Then, the electronic control unit 3 is configured to execute, for example, output control over the engine 4 and shift control over the transmission 6 in accordance with the control program prestored in the ROM or the PROM. That is, the electronic control unit 3 has both the function of an engine control ECU (electronic control unit) and the function of a shift control ECU to control the transmission 6.

The electronic control unit 3 serves as the engine control ECU. For example, the electronic control unit 3 calculates a target throttle valve opening degree on the basis of an accelerator operation amount Acc that is information detected by the accelerator position sensor 75. Then, the electronic control unit 3 controls the opening degree θth of the electronic throttle valve 81 to the target throttle valve opening degree. In addition, the electronic control unit 3 drives the fuel injection valve and ignition coil of each cylinder at a desired fuel injection timing and ignition timing of the cylinder on the basis of a crank angle CA detected by the crank angle sensor 72. Thus, the electronic control unit 3 controls the fuel injection timing, injection amount and ignition timing of the engine 4. In addition, the electronic control unit 3 is configured to crank the engine 4 with the use of the starter motor (not shown) at the time of starting the engine 4. In order to execute these controls over the engine 4, the electronic control unit 3 outputs various control signals ECS to the engine 4.

In addition, the electronic control unit 3 serves as the shift control ECU. For example, the electronic control unit 3 determines a target gear of the transmission 6 with the use of the shift map Msh on the basis of a current accelerator operation amount Acc and a current vehicle speed V. Then, the electronic control unit 3 outputs various control signals TCS to the hydraulic controller 16 as a shift command to form the engagement states of the plurality of clutches C1 to C4, brakes B1 and B2, and the like, to a combination of the target gear.

Specifically, when the current shift position (gear) of the transmission 6 matches with the target gear, the electronic control unit 3 keeps the current engagement states of the clutches C1 to C4, brakes B1 and B2, and the like. On the other hand, when the current shift position (gear) of the transmission 6 is different from the target gear, the electronic control unit 3 outputs a downshift command or an upshift command in order to shift from the current gear to the target gear, and changes the engagement states of the clutches C1 to C4, brakes B1 and B2, and the like, to a combination of the engagement states, corresponding to the target gear.

Furthermore, the electronic control unit 3 sets the condition of shift control over the transmission 6 to a condition preset as a fuel economy priority mode when the specific travel mode selection switch 79 provided for the vehicle 1 is not selected. Also, the electronic control unit 3 changes the condition of shift control to a condition preset as a specific mode, such as a manual shift mode and a sporty driving mode, when the specific travel mode selection switch 79 is selected. In the specific mode, the kinetic performance and drivability of the vehicle 1 are given a higher priority than fuel economy.

Here, at least the output shaft rotation speed sensor 67 and the throttle opening degree sensor 71 constitute a travelling state detecting unit 70 that detects a travelling state (at least a vehicle speed and an engine output) of the vehicle 1. Note that the travelling state detecting unit 70 may be configured to further include any one of the input shaft rotation speed sensor 66, the crank angle sensor 72, the air flow meter 73 and the coolant temperature sensor 74. Also, the travelling state detecting unit 70 may be configured to include an acceleration sensor (not shown), a gradient sensor (not shown), or the like.

Here, the accelerator position sensor 75 constitutes an operation input detecting unit 80 that detects an operation to indirectly request the transmission 6 to shift gears (issue a shift request). That is, the operation input detecting unit 80 has the accelerator position sensor 75 that serves as an acceleration request operation amount detector. The acceleration request operation amount detector detects an acceleration request operation amount by which the vehicle 1 is requested to accelerate. That is, the accelerator position sensor 75 is a sensor that detects a depression operation amount (accelerator operation amount corresponding to the depression operation amount) of the accelerator pedal 91.

Of course, the operation input detecting unit (detecting unit) 80 may be configured to include any one of the shift lever position sensor 77 and the paddle operation detecting switches 78a and 78b. The shift lever position sensor 77 and the paddle operation detecting switches 78a and 78b detect an operation that directly requests the transmission 6 to shift gears. Also, the operation input detecting unit 80 may be configured to include the specific travel mode selection switch 79. In this case, the operation input detecting unit 80 also has a shift request operation amount detector that detects a shift request operation amount of the shift lever 92 or the paddles 93a and 93b. The transmission 6 is requested to shift gears by the shift request operation amount. Thus, the operation input detecting unit 80 has a shift switch that is able to detect a request to make a sequential shift of the gear of the transmission 6.

The electronic control unit 3 serves as a shift control unit (control unit) that executes shift control over the gear of the transmission 6 in response to a travelling state of the vehicle 1 and a manual operation. Here, the travelling state is detected by the travelling state detecting unit 70, and the manual operation is detected by the operation input detecting unit 80. The electronic control unit 3 is configured to execute shift control in response to the travelling state and the (manual) operation. Specifically, the electronic control unit 3 is configured to execute downshift control to make a skip shift from one high-speed-side gear PH (for example, eighth-speed or seventh-speed gear) toward another low-speed-side gear PL (for example, fourth-speed or third-speed gear) among the multiple gears as shown in FIG. 4 in response to an operation that issues a multiple-gear skip downshift request (three or more gear skip shift request). For example, the operation, which issues a multiple-gear skip downshift request, is a depression operation of the accelerator pedal 91 that has an accelerator operation amount larger than or equal to a predetermined accelerator operation amount and that requests the vehicle 1 to accelerate.

In the present embodiment, when it is predicted to enter a driven state where power that accelerates an output, shifted in speed, to a predetermined acceleration or above is input from the rear wheels 8R and 8L side is input to the transmission 6, the electronic control unit 3 prohibits a direct skip downshift from one gear PH to another gear PL (similar control to the control described in JP 2010-266045 A). Note that "the power accelerates an output, shifted in speed" means "power causes a rotation speed of an output portion of the transmission 6 to increase". Thus, the electronic control unit 3 has a program that determines whether the vehicle 1 enters the driven state and stores the program in the RROM. As described above, in the driven state, power from the rear wheels 8R and 8L side is input to the transmission 6 and accelerates an output, shifted in speed, to the predetermined acceleration or above. Here, the electronic control unit 3 serves as a driven state determination unit. Additionally, the one gear PH serves as a first gear and the another gear PL serves as a second gear.

In addition, when the electronic control unit 3 executes skip downshift control from one gear PH to another gear PL, if the pre-shift one gear PH is higher than a predetermined intermediate-speed gear PI and the another gear PL that is a shift request gear is lower than the predetermined intermediate-speed gear PI, the electronic control unit 3 is configured to execute combined shift control that includes a skip shift from the one gear PH to the predetermined intermediate-speed gear PI and a sequential shift from the predetermined intermediate-speed gear PI to the another gear PL. Here, the skip shift referred in the combined shift control may be two or more gear skip shift request. That is, one or more shift gears may be included between the one gear PH and the predetermined intermediate-speed gear PI.

Alternatively, when it is determined that the vehicle 1 enters the driven state if a direct skip shift from the one gear PH toward the another gear PL is made in the specific travel mode, the electronic control unit 3 may execute combined shift control that includes a skip shift from the one gear PH to the predetermined intermediate-speed gear PI and a sequential shift from the predetermined intermediate-speed gear PI to the another gear PL.

Here, the one gear PH is any one of high-speed-side gears among the multiple gears of the multi-gear transmission 6, and the another gear PL is any one of low-speed-side gears among the multiple gears of the multi-gear transmission 6.

As shown in FIG. 4, for example, among the plurality of high-speed-side gears from the sixth-speed gear (6th in FIG. 4) to the eighth-speed gear (8th in FIG. 4), a difference in gear ratio (gear step) between any adjacent gears is small. Thus, the mean rate of change $\alpha 1$ in gear step within the range of these high-speed-side gears is small. On the other hand, for example, among the plurality of low-speed-side gears from the first-speed gear (1st in FIG. 4) to the third-speed gear (3rd in FIG. 4), a gear step is larger than the gear step within the range of the high-speed-side gears. Thus, the mean rate of change $\alpha 2$ in gear step within the range of these low-speed-side gears is relatively large. Then, a gear ratio within the range of the plurality of high-speed-side gears is a value close to a line La1 having a slope of the mean rate of change $\alpha 1$ in gear step. Also, a gear ratio within the range of the plurality of low-speed-side gears is a value close to a line La2 having a slope of the mean rate of change $\alpha 2$ in gear step.

The predetermined intermediate-speed gear PI is an intermediate-speed gear (for example, fifth-speed gear) close to the range of the high-speed-side gears having a small difference in gear step, among a plurality of intermediate-speed gears (for example, fourth-speed and fifth-speed gears) set between the range of these high-speed-side gears (for example, the range of the sixth-speed gear to the eighth-speed gear) and the range of the low-speed-side gears (for example, the range of first-speed gear to the third-speed gear). Note that the range of the plurality of high-speed-side gears, the range of the plurality of low-speed-side gears and the range of the plurality of intermediate-speed gears, of course, may change depending on set gear steps or the total number of gears of the transmission 6. Also, the predetermined intermediate-speed gear PI is not limited to the fifth-speed gear.

More specifically, for example, when the electronic control unit 3 executes skip shift control from the eighth-speed gear that is one gear PH toward the fourth-speed gear that is another gear PL, the pre-shift eighth-speed gear is higher by multiple gears than the fifth-speed gear that is the predetermined intermediate-speed gear PI and the fourth-speed gear that is a shift request gear is lower than the fifth-speed gear. In this case, the electronic control unit 3 executes shift control (hereinafter, referred to as combined shift control) that includes a skip shift by three gears from the eighth-speed gear to the fifth-speed gear and a sequential shift from the fifth-speed gear to the fourth-speed gear. Alternatively, when the electronic control unit 3 executes skip shift control from the seventh-speed gear that is one gear PH toward the fourth-speed, third-speed or second-speed gear that is another gear PL, the pre-shift seventh-speed gear is higher than the fifth-speed gear and the fourth-speed, third-speed or second-speed gear that is a shift request gear is lower than the fifth-speed gear. In this case, the electronic control unit 3 executes combined shift control that includes a skip shift by two gears from the seventh-speed gear to the fifth-speed gear and a sequential shift from the fifth-speed gear to the fourth-speed, third-speed or second-speed gear.

Note that, when the electronic control unit 3 executes skip shift control from the sixth-speed gear toward the third-speed or second-speed gear, because the pre-shift sixth-speed gear is higher than the fifth-speed gear that is the predetermined intermediate-speed gear PI and the fourth-speed or third-speed gear that is a shift request gear is lower than the fifth-speed gear, a condition that a skip shift down to the fifth-speed gear is allowed is satisfied. However, it is a downshift by one gear from the sixth-speed gear to the fifth-speed gear, so, in this case, shift control includes a shift from the sixth-speed gear to the fifth-speed gear and a shift from the fifth-speed gear to the fourth-speed or third-speed gear and the shift control makes only a sequential shift. Thus, in the present embodiment, if the pre-shift gear is substantially higher by multiple gears than the fifth-speed gear that is the predetermined intermediate-speed gear PI, a condition that a skip shift down to the fifth-speed gear is allowed is satisfied.

Next, the operation of the shift control system according to the present embodiment will be described, and a shift control method according to the first embodiment of the invention, which is implemented with the use of the shift control system according to the present embodiment, will be described.

In the above-configured shift control system according to the present embodiment, while the vehicle 1 is travelling in the standard mode, a target gear of the transmission 6 is determined with the use of the shift map Msh on the basis of a current accelerator operation amount Acc and a current vehicle speed V. Then, control signals TCS that form the target gear is output from the electronic control unit 3 to the hydraulic controller 16 as a shift command.

For example, when the current shift position (gear) of the transmission 6 matches with the target gear, the current engagement states of the clutches C1 to C4, brakes B1 and B2, and the like, are kept; whereas, when the current shift position (gear) of the transmission 6 is different from the target gear, a downshift command or an upshift command is output in order to shift from the current gear to the target gear. Then, the engagement states of the clutches C1 to C4, brakes B1 and B2, and the like, are changed to a combination of the engagement states, corresponding to the target gear.

Now, for example, when the accelerator pedal 91 is depressed to the predetermined accelerator operation amount or above in order to cause the vehicle 1 to travel on an uphill and a downshift is made from one high-speed-side gear PH toward another low-speed-side gear PL, a downshift command is generated by the electronic control unit 3, and the program of combined shift control is started.

Figure 5:
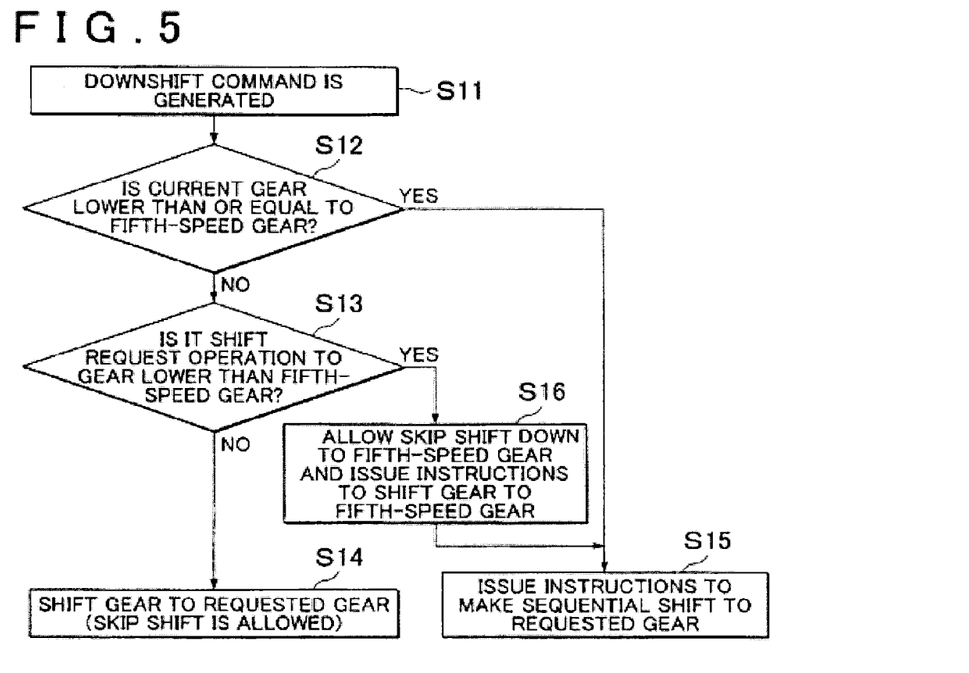
FIG. 5 is a flowchart that shows the schematic flow of a control program that implements a shift control method according to the first embodiment of the invention.

FIG. 5 shows the schematic flow of such combined shift control program executed by the electronic control unit 3.

As shown in the drawing, in the present embodiment, when a downshift command is generated in the electronic control unit 3 in response to an acceleration request operation input through the accelerator pedal 91 (step S11), it is determined whether a current gear is lower than or equal to the fifth-speed gear that is the predetermined intermediate-speed gear PI (step S12). Then, when the determination result is affirmative (yes in step S12), instructions for a sequential shift from the current gear to the requested gear are issued, and the sequential shift is made (step S15). In this case, for example, control signals TCS are output from the electronic control unit 3 to the hydraulic controller 16 such that a sequential downshift is made from the current fourth-speed gear to the second-speed gear that is the requested gear. Thus, the engagement states of the clutches C1 to C4, brakes B1 and B2, and the like, in the transmission 6 are sequentially changed to a combination of the engagement states of the fourth-speed gear to a combination of the engagement states of the third-speed gear and, subsequently, changed from the combination of the engagement states of the third-speed gear to a combination of the engagement states of the second-speed gear.

When the current gear is not lower than or equal to the fifth-speed gear and the determination result in step S12 is negative, it is subsequently determined whether a downshift to a gear lower than the fifth-speed gear is requested (step S13). Then, when the determination result is affirmative (yes in step S13), a skip shift from the current gear to the fifth-speed gear is allowed, instructions for a shift down to the fifth-speed gear are issued and the shift is made (step S16), and subsequently instructions for a sequential shift from the fifth-speed gear to the requested gear are issued and the sequential shift is made (step S15). In this case, at first, for example, control signals TCS are output from the electronic control unit 3 to the hydraulic controller 16 such that a skip shift by two gears is made from the current seventh-speed gear to the fifth-speed gear. Thus, the engagement states of clutches C1 to C4, brakes B1 and B2, and the like, in the transmission 6 are directly changed from a combination of the engagement states of the seventh-speed gear to a combination of the engagement states of the fifth-speed gear. Subsequently, control signals TCS are output from the electronic control unit 3 to the hydraulic controller 16 such that a sequential downshift is made from the fifth-speed gear to the third-speed gear. Thus, the engagement states of the clutches C1 to C4, brakes B1 and B2, and the like, in the transmission 6 are sequentially changed from a combination of the engagement states of the fifth-speed gear to a combination of the engagement states of the fourth-speed gear and, subsequently, changed from the combination of the engagement states of the fourth-speed gear to a combination of the engagement states of the third-speed gear.

When a downshift to a gear lower than the fifth-speed gear is not requested and the determination result in step S13 is negative, a shift from the current gear to the requested gear is subsequently made (step S14). In this case, when a multiple-gear shift from the current gear to the requested gear is requested, a skip shift can be made. For example, a sequential shift from the current eighth-speed gear to the seventh-speed gear or from the current seventh-speed gear to the sixth-speed gear is made. Alternatively, a skip shift by two gears from the current eighth-speed gear to the sixth-speed gear or from the current seventh-speed gear to the sixth-speed gear is made.

In this way, in the present embodiment, when a shift into a travelling state that needs a downshift of the transmission 6 is requested by depressing the accelerator pedal 91 to the predetermined accelerator operation amount or above and the request operation has been detected by the accelerator position sensor 75, downshift control, such as multiple-gear skip shift control, is executed in response to a travelling state detected by the travelling state detecting unit 70 and an operation detected by the operation input detecting unit 80.

Then, the shift control method as follows is employed. When skip shift control for making a skip shift from one high-speed-side gear PH toward another gear PL, on the condition that the one gear PH is higher than the predetermined intermediate-speed gear PI and the another gear PL is lower than the predetermined intermediate-speed gear PI, combined shift control that includes a skip shift between the one gear PH and the predetermined intermediate-speed gear PI and a sequential shift between the another gear PL and the predetermined intermediate-speed gear PI is executed. In the skip shift, these gears PH and PL are different by multiple gears in order of a sequential shift among the multiple gears of the transmission 6.

Incidentally, when a skip downshift is requested, a gear step between any adjacent gears is relatively small between the pre-shift one high-speed-side gear PH and the predetermined intermediate-speed gear PI, so it is less likely that the acceleration or deceleration of the vehicle 1 steeply increases even when a skip shift is made. On the other hand, between the requested another low-speed-side gear PL and the predetermined intermediate-speed gear PI, a gear step between any adjacent gears is relatively large, and it is likely that the acceleration or deceleration of the vehicle 1 steeply increases when a skip downshift is made.

In the shift control system and method according to the present embodiment, on the condition that the one gear PH is higher than the predetermined intermediate-speed gear PI and the another gear PL is lower than the predetermined intermediate-speed gear PI, combined shift control is executed. As described above, the combined shift control includes a skip shift between the one gear PH and the predetermined intermediate-speed gear PI and a sequential shift between the another gear PL and the predetermined intermediate-speed gear PI. Thus, irrespective of a difference among gear steps set in the multi-gear transmission 6 having a large number of gears, while ensuring a desired response by allowing the skip shift, it is possible to improve drivability by appropriately suppressing a variation in the acceleration or deceleration of the vehicle 1 before and after a skip shift within a predetermined limited range using a sequential shift as well.

In addition, in the present embodiment, when a multiple (three or more) gear shift of the gear of the transmission 6 is requested in response to an acceleration request operation amount higher than or equal to the predetermined accelerator operation amount detected by the accelerator position sensor 75, appropriate shift control that includes a skip shift is allowed on the basis of the request operation amount. Thus, it is possible to eliminate the problem that there are many number of times of sequential shifts in an automatic shift mode and, therefore, a response to a driver's acceleration request, or the like, is not sufficient. In addition, the depression operation amount of the accelerator pedal 91 is detected, so it is possible to reliably improve a response to a driver's acceleration request.

As described above, according to the present embodiment, when a shift from one gear PH higher than the predetermined intermediate-speed gear PI to another gear PL lower than the predetermined intermediate-speed gear PI is requested, combined shift control, which includes a skip shift between the one gear PH and the predetermined intermediate-speed gear PI and a sequential shift between the another gear PL and the predetermined intermediate-speed gear PI, is executed. Thus, while suppressing a variation in acceleration or deceleration before and after a skip downshift within a predetermined limited range, it is possible to provide the shift control system and the shift control method that are able to improve drivability by allowing a skip downshift irrespective of a difference in gear step set in the multi-gear transmission 6, the multi-gear transmission 6 having a large number of gears.

Figure 6:
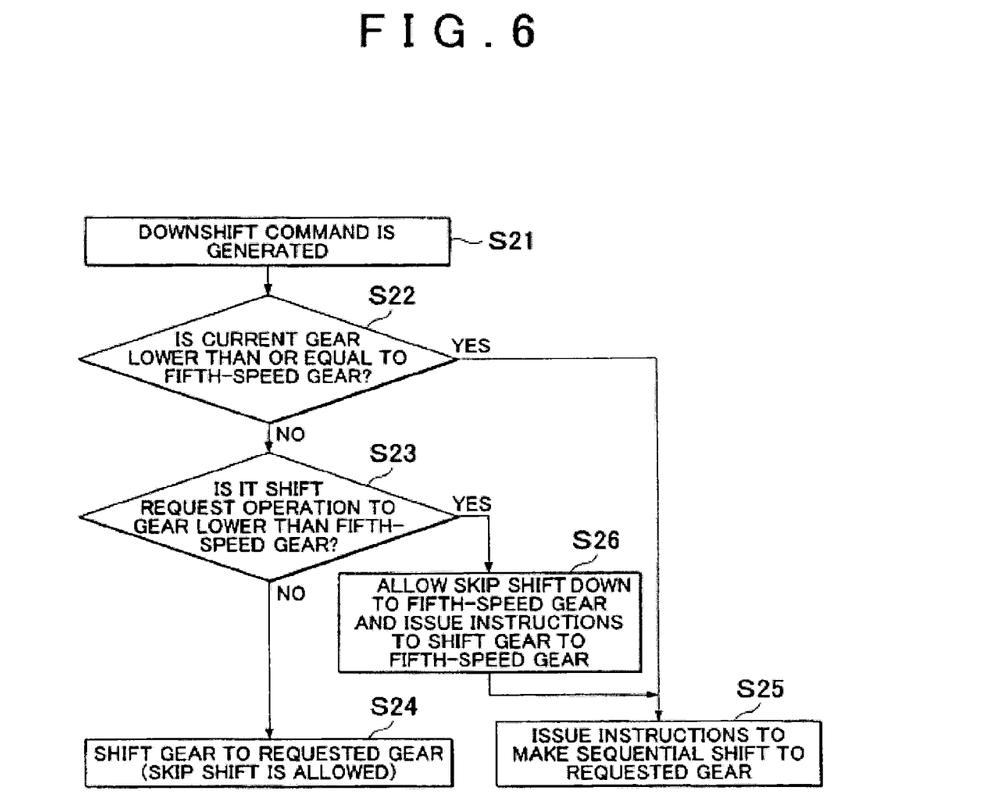
FIG. 6 is a flowchart that shows the schematic flow of a control program that implements a shift control method according to a second embodiment of the invention.

FIG. 6 shows the schematic flow of a control program that implements a shift control method according to a second embodiment of the invention. Note that the embodiments described below have a substantially similar configuration of a shift control system to that of the above-described first embodiment, and are not shown in the drawing. Then, like reference numerals denote similar component elements to those of the first embodiment, shown in FIG. 1 to FIG. 5.

In the present embodiment, the operation input detecting unit 80 is configured to include the shift lever position sensor 77, the paddle operation detecting switches 78a and 78b and the specific travel mode selection switch 79. These shift lever position sensor 77 and paddle operation detecting switches 78a and 78b each are configured to include a plurality of shift switches that are able to detect a request to make a sequential shift of the gear of the transmission 6. In addition, the shift lever position sensor 77 and the paddle operation detecting switches 78a and 78b serve as a shift request operation amount detector. The shift request operation amount detector detects: a shift request operation amount of the shift lever 92, by which the multi-gear transmission 6 is requested to shift gears; whether the right and left paddles 93b and 93a for sequential shift operation are operated; and the number of successive operations at the time of operating the right and left paddles 93b and 93a.

Then, for example, when any one of the shift lever position sensor 77 and the paddle operation detecting switches 78a and 78b detects a shift request operation amount larger than or equal to a predetermined number of shift gears of the multi-gear transmission 6, the electronic control unit 3 executes skip downshift control in response to the input shift request operation and a vehicle travelling state detected by the travelling state detecting unit 70. In the skip downshift control, a skip shift is made from one high-speed-side gear PH toward another low-speed-side gear PL among the multiple gears.

As shown in FIG. 6, in the present embodiment, first, when a downshift operation has been detected by the operation input detecting unit 80 (step S21), it is determined whether a current gear is lower than or equal to the fifth-speed gear that is the predetermined intermediate-speed gear PI (step S22). Then, when the determination result is affirmative (yes in step S22), a sequential shift from the current gear to the requested gear is made (step S25). For example, a sequential downshift is made from the current fourth-speed gear to the second-speed gear that is the requested gear.

When the current gear is not lower than or equal to the fifth-speed gear and the determination result in step S22 is negative, it is subsequently determined whether a downshift to a gear lower than the fifth-speed gear is requested (step S23). Then, when the determination result is affirmative (yes in step S23), a skip shift from the current gear to the fifth-speed gear is allowed and a shift down to the fifth-speed gear is made (step S26), and subsequently a sequential shift from the fifth-speed gear to the requested gear is made (step S25). For example, a skip shift by two gears is made from the current seventh-speed gear to the fifth-speed gear, and then a sequential shift is made from the fifth-speed gear to the third-speed gear that is the requested gear.

When a downshift to a gear lower than the fifth-speed gear is not requested and the determination result in step S23 is negative, a shift from the current gear to the requested gear is subsequently made (step S24). In this case, when a multiple-gear shift from the current gear to the requested gear is requested, a skip shift can be made. For example, a sequential shift from the current eighth-speed or seventh-speed gear to the seventh-speed or sixth-speed gear or a skip shift by two gears from the current eighth-sped or seventh-speed gear to the sixth-speed or fifth-speed gear is made.

In this way, in the shift control system and method according to the present embodiment, when the operation input detecting unit 80 has detected a shift request operation amount that is larger than or equal to the predetermined number of gears and the transmission 6 is requested to shift gears on the basis of the shift request operation amount, appropriate shift control that includes a skip shift and a sequential shift based on the request operation amount is possible. Thus, it is possible to prevent a large difference between the acceleration or deceleration of the vehicle 1 through a skip downshift and a degree of acceleration or deceleration intended by the driver with the use of a sequential shift while ensuring a desired response through the skip shift.

In addition, in the present embodiment, the shift lever position sensor 77 and the paddle operation detecting switches 78a and 78b are configured to include a plurality of shift switches that are able to detect a request to make a sequential shift of the gear of the transmission 6, so it is possible to reliably improve a response to a driver's shift request operation.

In addition, in the present embodiment, when the shift lever position sensor 77 and the paddle operation detecting switches 78a and 78b have detected a shift request operation amount, by which the transmission 6 is requested to shift gears, and skip shift control is executed on the basis of the shift request operation amount and a travelling state of the vehicle 1, combined shift control is allowed to be executed. Thus, when a downshift request operation that requests a skip shift from a high-speed-side gear higher than the predetermined intermediate-speed gear PI is performed, combined shift control that includes a skip shift is executed on the basis of the request operation amount. As a result, the number of sequential shifts is suppressed, a response to a driver's acceleration request is sufficiently ensured, and, in addition, it is possible to prevent a large difference between an acceleration or deceleration of the vehicle through a skip shift and a degree of acceleration or deceleration intended by the driver.

Figure 7:
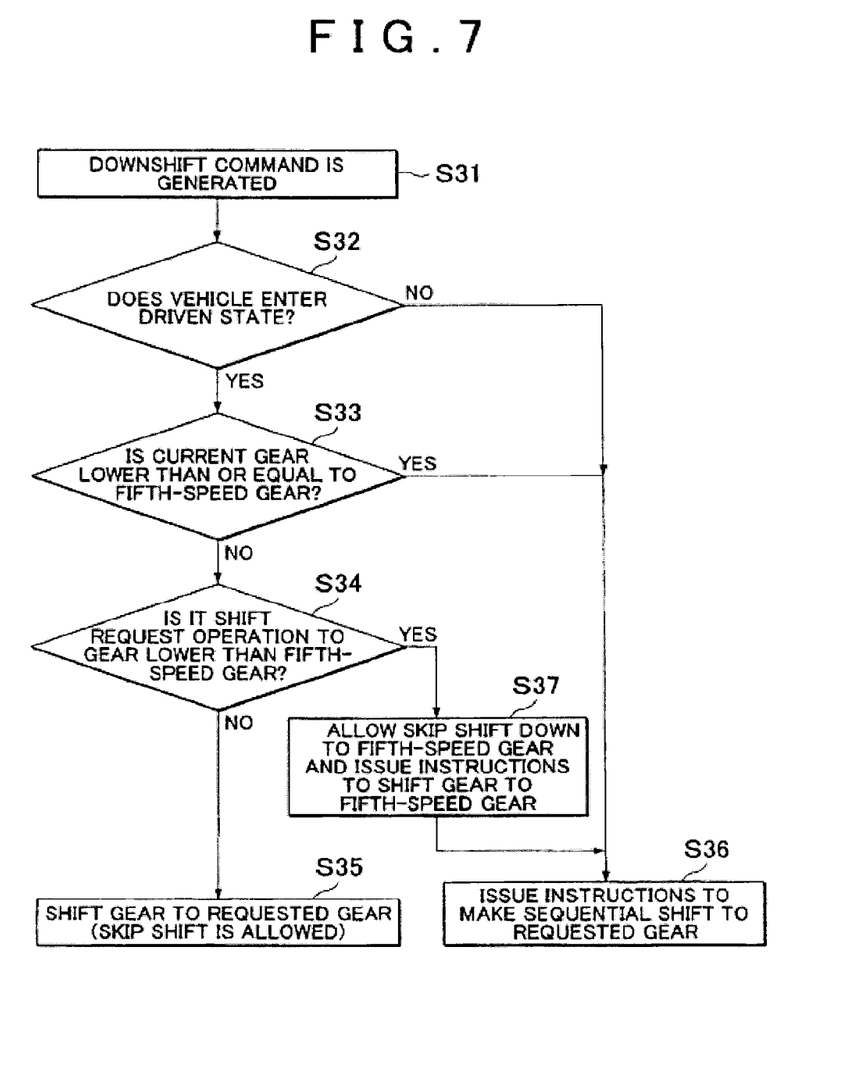
FIG. 7 is a flowchart that shows the schematic flow of a control program that implements a shift control method according to a third embodiment of the invention.

FIG. 7 is a flowchart that shows the schematic flow of a control program that implements a shift control method according to a third embodiment of the invention.

In the present embodiment, the electronic control unit 3 has the function of the driven state determination unit that determines whether the vehicle 1 enters a driven state where power that accelerates an output, shifted in speed, to the predetermined acceleration or above is input from the rear wheels 8R and 8L side to the transmission 6 as in the case of the first embodiment. In addition to the above function, in the third embodiment of the invention, the electronic control unit 3 has a function of allowing combined shift control to be executed when it is determined that the vehicle 1 enters the driven state.

In addition, when the specific drive mode is selected by the specific travel mode selection switch 79 and a skip shift to a gear that causes the driven state is requested, the electronic control unit 3 allows combined shift control to be executed.

Note that, in the third embodiment of the invention, the case of the driven state is, for example, a case where: a shift request operation amount has been detected by the shift lever position sensor 77 and the paddle operation detecting switches 78a and 78b; and the shift request operation amount corresponds to a shift request amount that is requested in a multiple-gear skip downshift from a high-speed-side gear of the transmission 6. Here, a shift gear that is requested in the multiple-gear skip downshift is larger than or equal to a predetermined number of gears.

More specifically, when a skip shift from one high-speed-side gear PH to another low-speed-side gear PL, causing the driven state, is requested, the electronic control unit 3 according to the present embodiment executes a combined shift control program as shown by the schematic flow in FIG. 7.

As shown in FIG. 7, in the present embodiment, first, when a downshift operation has been detected by the operation input detecting unit 80 (step S31), it is determined by the electronic control unit 3 whether the vehicle 1 enters the driven state where power from the rear wheels 8R and 8L side is input to the transmission 6 and where an output, shifted in speed, is accelerated to the predetermined acceleration or above (step S32). Here, the electronic control unit 3 that serves as the driven state determination unit. When the determination result is negative and the vehicle 1 does not enter the driven state, a sequential shift from the current gear to the requested gear is made (step S36). For example, a sequential downshift is made from the current fourth-speed gear to the second-speed gear that is the requested gear.

On the other hand, when the vehicle 1 enters the driven state (yes in step S32), it is subsequently determined whether a current gear is lower than or equal to the predetermined intermediate-speed gear PI, for example, the fifth-speed gear (step S33). Then, when the determination result is affirmative (yes in step S33), a sequential shift from the current gear to the requested gear is made (step S36).

When the current gear is not lower than or equal to the fifth-speed gear and the determination result in step S33 is negative, it is subsequently determined whether a downshift to a gear lower than the fifth-speed gear is requested (step S34). Then, when the determination result is affirmative (yes in step S34), a skip shift from the current gear to the fifth-speed gear is allowed and a shift down to the fifth-speed gear is made (step S37), and subsequently a sequential shift from the fifth-speed gear to the requested gear is made (step S36). For example, a skip shift by two gears is made from the current seventh-speed gear to the fifth-speed gear, and then a sequential shift is made from the fifth-speed gear to the second-speed gear that is the requested gear.

When a downshift to a gear lower than the fifth-speed gear is not requested and the determination result in step S34 is negative (no in step S34), a shift from the current gear to the requested gear is subsequently made (step S35). In this case, when a multiple-gear shift from the current gear to the requested gear is requested, a skip shift is made.

In the present embodiment as well, when an operation that requests a multiple-gear skip shift from a high-speed-side gear higher than the predetermined intermediate-speed gear PI is performed, combined shift control that includes a skip shift is executed on the basis of the request operation amount. As a result, the number of sequential shifts is suppressed, a response to a driver's acceleration request is sufficiently ensured. In addition, it is possible to prevent a large difference between an acceleration or deceleration of the vehicle through a skip shift and a degree of acceleration or deceleration intended by the driver by using a sequential shift as well.

Furthermore, in the present embodiment, while effectively avoiding a situation that the vehicle 1 is steeply decelerated as a result of the driven state, that is, a so-called overrevolution state of the engine 4, it is possible to reliably make a downshift to a low-speed-side gear requested by the driver.

Note that, in the above-described embodiments, the transmission 6 is configured as a multi-gear transmission equipped with a torque converter, which includes the plurality of planetary gear sets GS1 and GS2, the plurality of rotating elements RM1, RM2, RM3 and RM4, the clutches C1, C2, C3 and C4 and brakes B1 and B2, and the like, that serve as the plurality of hydraulic frictional engagement elements; instead, the transmission according to the invention may be a transmission that shifts gears with the use of another electric actuator, or the like, without using the plurality of hydraulic frictional engagement elements. In addition, the transmission 6 may be configured to include a shifting mechanism other than a gear mechanism, and the torque converter is not always required. The engine 4 is the internal combustion engine. Instead, the engine 4 may be a hybrid engine that also uses an electric motor or may be another rotary power source.

Furthermore, the invention is also applicable to the case where the transmission 6 is a substantially continuously variable transmission and the transmission 6 is shifted among multiple speed ratios in response to a manual shift operation.

Of course, the drive wheels of the vehicle 1 may be not the rear wheels 8R and 8L but the front wheels. In addition, it is conceivable to variably set the predetermined intermediate-speed gear PI on the basis of a difference among the standard drive mode, the fuel economy priority drive mode, the vehicle kinetic performance priority mode, and the like.

As described above, when a shift from one gear PH higher than the predetermined intermediate-speed gear PI to another gear PL lower than the predetermined intermediate-speed gear PI is requested, the shift control system according to the invention executes combined shift control that includes a skip shift from the one gear PH to the predetermined intermediate-speed gear PI and a sequential shift from the predetermined intermediate-speed gear PI to the another gear PL. Thus, irrespective of a difference in speed ratio between any adjacent gears in the multi-gear transmission having a large number of gears, while ensuring a desired response by allowing the skip shift, it is possible to suppress a variation in the acceleration or deceleration of the vehicle 1 before and after a skip shift within a predetermined limited range using a sequential shift as well. As a result, it is possible to provide the shift control system and the shift control method that improve drivability. The thus configured invention is generally useful in the shift control system and the shift control method that cause the shifting mechanism to shift multiple gears in response to an operation and that selectively make a skip shift.

A first aspect of the invention relates to a shift control system that is mounted on a vehicle in which a transmission that shifts a speed of rotational power from an engine in response to a shift request and that outputs the rotational power to a drive wheel side has a multi-gear shifting mechanism. The shift control system includes: a detecting unit that detects the shift request; and a control unit that, when a multiple-gear skip downshift request from a first gear that is higher by multiple gears than a predetermined intermediate-speed gear to a second gear has been detected by the detecting unit as the shift request, executes shift control that includes a skip shift from the first gear to the predetermined intermediate-speed gear and a sequential shift from the predetermined intermediate-speed gear to the second gear.

When the second gear is lower than the multiple intermediate-speed gears, the control unit may execute the shift control. In this case, irrespective of, for example, a difference in gear step (difference in speed ratio between any adjacent gears) set in the multi-gear transmission having a large number of gears, it is possible to appropriately ensure a response through a skip shift.

In the shift control system, when an operation to request the vehicle to accelerate is performed and the shift request from the first gear to the second gear has been detected by the detecting unit, the control unit may execute the shift control in response to the shift request. In this case, it is possible to reliably improve a response to a driver's acceleration request.

In the shift control system, the control unit may execute the shift control in response to a manual operation that is the shift request to make a shift from the first gear to the second gear. In this case, when the transmission is requested to shift gears in response to a manual operation (shift request operation), it is possible to appropriately execute shift control that includes a skip shift and a sequential shift on the basis of the request operation amount, and it is possible to improve a response to a driver's shift request operation. In addition, it is possible to prevent a large difference between an acceleration or deceleration of the vehicle through a skip shift and a degree of acceleration or deceleration intended by the driver.

In the shift control system, in a state where a current gear of the multi-gear shifting mechanism is lower than the predetermined intermediate-speed gear, when a second shift request to downshift from the current gear is issued as the shift request, the control unit may execute a sequential shift from the current gear to a requested gear in response to the second shift request. In this case, when the current gear is lower than the predetermined intermediate-speed gear, a skip downshift is not made, so it is possible to prevent a large difference between an acceleration or deceleration of the vehicle through a skip shift and a degree of acceleration or deceleration intended by the driver.

The shift control system may further include a driven state determination unit that determines whether the vehicle enters a driven state where power from the drive wheel side that accelerates an output, shifted in speed, is input to the transmission. Then, when it is determined by the driven state determination unit that the vehicle enters the driven state, the control unit may execute the shift control. In the driven state, the power accelerates an output, shifted in speed, that is, the power cause a rotation speed of an output portion of the transmission to increase. In this case, even when a skip shift to a gear that causes the driven state is requested, it is possible to reliably make a shift up to a gear requested by the driver while effectively avoiding a situation that the vehicle enters a so-called overrevolution state and is steeply decelerated. Note that, when a skip shift to a gear that causes the driven state is requested, such combined shift control (a skip shift up to the predetermined intermediate-speed gear and a subsequent sequential shift) may be executed only when a specific drive mode is selected by a mode selection switch, or the like.

The shift control system may further include a driven state determination unit that determines whether the vehicle enters a driven state where power the drive wheel side is input from to the transmission. Then, when it is determined by the driven state determination unit that the vehicle enters the driven state, the control unit may prohibit a direct skip shift from the first gear to the second gear; whereas, when it is determined by the driven state determination unit that the vehicle does not enter the driven state, the control unit may execute the shift control. In the driven state, the power accelerates an output, shifted in speed, that is, the power cause a rotation speed of an output portion of the transmission to increase. In this case, when not a skip shift to a gear that causes the driven state and the vehicle does not enter a so-called overrevolution state but the number of shifted gears is large, it is possible to reliably make a shift up to a gear requested by the driver while effectively avoiding a situation that the vehicle is relatively steeply decelerated.

A second aspect of the invention relates to a shift control method that is mounted on a vehicle in which a transmission that shifts a speed of rotational power from an engine in response to a shift request and that outputs the rotational power to a drive wheel side has a multi-gear shifting mechanism. The shift control method includes: detecting the shift request; and, when a multiple-gear skip downshift request from a first gear that is higher by multiple gears than a predetermined intermediate-speed gear to a second gear has been detected as the shift request, executing shift control that includes a skip shift from the first gear to the predetermined intermediate-speed gear and a sequential shift from the predetermined intermediate-speed gear to the second gear.

In the shift control method, when the second gear is lower than the multiple intermediate-speed gears, the shift control may be executed.

In the shift control method, when an operation to request the vehicle to accelerate is performed and the shift request from the first gear to the second gear has been detected, the shift control may be executed. In this case, when the transmission is requested to shift gears in response to an acceleration request operation, shift control that includes a skip shift is executed on the basis of the request operation amount, so the number of sequential shifts is suppressed, and a response to a driver's acceleration request is sufficiently ensured. In addition, the shift control may be executed in response to the shift request.

In the shift control method, a manual operation that is the shift request to request a shift from the first gear to the second gear is performed, the shift control may be executed. In this case, when a shift request operation that requests a skip shift from a high gear is performed, shift control that includes a skip shift and a sequential shift is executed on the basis of the request operation amount. Thus, not only a response to a driver's acceleration request is sufficiently ensured, but also it is possible to prevent a large difference between an acceleration or deceleration of the vehicle through a skip shift and a degree of acceleration or deceleration intended by the driver. In addition, the shift control may be executed in response to the manual operation.

In the shift control method, in a state where a current gear of the multi-gear shifting mechanism is lower than the predetermined intermediate-speed gear, when a second shift request to downshift from the current gear is issued as the shift request, a sequential shift from the current gear to a requested gear may be executed in response to the second shift request.

The shift control method may further include determining whether the vehicle enters a driven state where power from the drive wheel side is input to the transmission. Then, when it is determined that the vehicle enters the driven state, the shift control may be executed. In the driven state, the power accelerates an output, shifted in speed, that is, the power cause a rotation speed of an output portion of the transmission to increase. In this case, even when a skip shift to a gear that causes the driven state is requested, it is possible to reliably make a shift up to a gear requested by the driver while avoiding a situation that the vehicle enters the driven state and is steeply decelerated.

The shift control method may further include determining whether the vehicle enters a driven state where power from the drive wheel side is input to the transmission. Then, when it is determined that the vehicle enters the driven state, a direct skip shift from the first gear to the second gear may be prohibited; whereas, when it is determined that the vehicle does not enter the driven state, the shift control may be executed. In the driven state, the power accelerates an output, shifted in speed, that is, the power cause a rotation speed of an output portion of the transmission to increase. In this case, when not a skip shift to a gear that causes the driven state and the vehicle does not enter a so-called overrevolution state but the number of shifted gears is large, it is possible to reliably carry out a shift up to a gear requested by the driver while effectively avoiding a situation that the vehicle is relatively steeply decelerated.

What is claimed is:

1. A shift control system that is mounted on a vehicle that includes a transmission, the transmission including a multi-gear shifting mechanism, and the transmission being configured to shift a speed of rotational power from an engine in response to a shift request, and to output the rotational power to a drive wheel side, the shift control system comprising:
    a detecting unit that is constituted by a travelling state detecting sensor and an operation input detecting sensor, the travelling state detecting sensor being configured to detect a travelling state of the vehicle, the operation input detecting sensor being configured to detect an operation that issues the shift request; and
    an electronic control unit that, when the detecting unit has detected that the shift request is a multiple-gear skip downshift request from a first gear position to a second gear position, executes shift control in which, after a skip shift from the first gear position to a predetermined intermediate-speed gear position is made, a sequential shift from the predetermined intermediate-speed gear position to the second gear position is made, wherein
    the first gear position is higher by multiple gear positions than the predetermined intermediate-speed gear position,
    at least one shift gear position is included between the first gear position and the predetermined intermediate-speed gear position,
    the electronic control unit is configured to make the skip shift from the first gear position to the predetermined intermediate-speed gear position without forming the at least one shift gear position,
    a gear ratio of the predetermined intermediate-speed gear position is larger than a gear ratio of the first gear position and smaller than a gear ratio of the second gear position, and
    a gear ratio of the at least one shift gear position is larger than the gear ratio of the first gear position and the gear ratio of the predetermined intermediate-speed gear position.

2. The shift control system according to claim 1, wherein when the second gear position is lower than a plurality of intermediate-speed gear positions which include the predetermined gear position, the electronic control unit executes the shift control.

3. The shift control system according to claim 1, wherein when an operation to request the vehicle to accelerate is performed and the detecting unit has detected the shift request from the first gear position to the second gear position, the electronic control unit executes the shift control in response to the shift request.

4. The shift control system according to claim 1, wherein:
the electronic control unit executes the shift control in response to a manual operation, and
the manual operation is the shift request to make a shift from the first gear position to the second gear position.

5. The shift control system according to claim 1, wherein in a state where a current gear position of the multi-gear shifting mechanism is lower than the predetermined intermediate-speed gear position, when the shift request is a second shift request to downshift from the current gear position, the electronic control unit executes a sequential shift from the current gear position to a requested gear position in response to the second shift request.

6. The shift control system according to claim 1, wherein:
the electronic control unit determines whether the vehicle enters a driven state where power from the drive wheel side is input to the transmission,
when the electronic control unit has determined that the vehicle enters the driven state, the electronic control unit executes the shift control, and
the power causes a rotation speed of an output portion of the transmission to increase in the driven state.

7. The shift control system according to claim 1, wherein:
the electronic control unit determines whether the vehicle enters a driven state where power from the drive wheel side is input to the transmission,
when the electronic control unit has determined that the vehicle enters the driven state, the electronic control unit prohibits a direct skip shift from the first gear position to the second gear position,
when the electronic control unit has determined that the vehicle does not enter the driven state, the electronic control unit executes the shift control, and
the power causes a rotation speed of an output portion of the transmission to increase in the driven state.

8. The shift control system according to claim 1, wherein
in a state where a current gear position of the multi-gear shifting mechanism is higher than the predetermined intermediate-speed gear position, and when the shift request is a gear position higher than the predetermined intermediate-speed gear position, the electronic control unit executes a shift from the current gear position to the requested gear position in response to the shift request.

* * * * *